US009746352B2

(12) United States Patent
Petroski et al.

(10) Patent No.: US 9,746,352 B2
(45) Date of Patent: Aug. 29, 2017

(54) METHOD AND APPARATUS FOR UNDERGROUND EQUIPMENT MONITORING

(71) Applicant: Symboticware Incorporated, Sudbury (CA)

(72) Inventors: Kirk G. R. Petroski, Sudbury (CA); Victor M. Corrales, Toronto (CA)

(73) Assignee: SYMBOTICWARE INCORPORATED, Sudbury, ON (CA)

( * ) Notice: Subject to any disclaimer, the term of this patent is extended or adjusted under 35 U.S.C. 154(b) by 1099 days.

(21) Appl. No.: 13/853,836

(22) Filed: Mar. 29, 2013

(65) Prior Publication Data

US 2014/0297225 A1  Oct. 2, 2014

(51) Int. Cl.
*G01D 9/28* (2006.01)
*H04B 13/02* (2006.01)

(52) U.S. Cl.
CPC ............... *G01D 9/28* (2013.01); *H04B 13/02* (2013.01)

(58) Field of Classification Search
CPC .......... G01D 9/28; H04B 13/02; G05B 23/02; G06Q 10/06
See application file for complete search history.

(56) References Cited

U.S. PATENT DOCUMENTS

| | | | |
|---|---|---|---|
| 6,553,336 B1 * | 4/2003 | Johnson | G01D 3/022 702/108 |
| 7,450,000 B2 | 11/2008 | Gidge et al. | |
| 7,663,502 B2 | 2/2010 | Breed | |
| 2006/0052985 A1 * | 3/2006 | Ito | F16K 37/0091 702/188 |
| 2006/0094970 A1 * | 5/2006 | Drew | A61B 5/0006 600/509 |
| 2007/0008408 A1 * | 1/2007 | Zehavi | G08B 13/19613 348/143 |
| 2007/0103303 A1 * | 5/2007 | Shoarinejad | G01S 19/05 340/572.1 |
| 2009/0080497 A1 * | 3/2009 | Wang | H04B 1/7143 375/132 |

(Continued)

FOREIGN PATENT DOCUMENTS

WO  2006/137072 A2  12/2006

OTHER PUBLICATIONS

"An Open Platform for Underground Vehicle Monitoring" Powerpoint Presentation: Maintenance Engineering Mine Operators (MEMO) Conference, Sudbury, Ontario, Oct. 27, 2010 <http://memo2013.cim.org/>.

(Continued)

*Primary Examiner* — Mohamed Charioui
*Assistant Examiner* — Jeremy Delozier
(74) *Attorney, Agent, or Firm* — Lynn C. Schumacher; Stephen W. Leonard; Hill & Schumacher

(57) ABSTRACT

The present disclosure provides a system which collects data from a set of sensors installed on underground vehicles which is then transferred to a remote data collection node through multiple communication protocol/channels according to priority calculations. Data priority is defined based on the evaluation of individual criteria and a set of weights. Priorities, weights and criteria can be dynamically adjusted depending on environmental factors. The protocol, channel and transfer order will depend upon calculated priorities.

38 Claims, 13 Drawing Sheets

(56) References Cited

U.S. PATENT DOCUMENTS

2009/0276186 A1* 11/2009 Salinas .............. G01N 15/1425
702/188
2012/0094683 A1* 4/2012 Yoeli .................... G01S 5/0027
455/456.1

OTHER PUBLICATIONS

Fava, Lorrie, et al. "An Open Platform for Underground Vehicle Monitoring" Submitted at the Maintenance Engineering Mine Operators (MEMO) 2010 Conference.
International Written Opinion for PCT/CA2014/050304, Dated Aug. 6, 2014, 3 pages.
International Search Report for PCT/CA2014/050304, Dated Aug. 6, 2014, 4 pages.

* cited by examiner

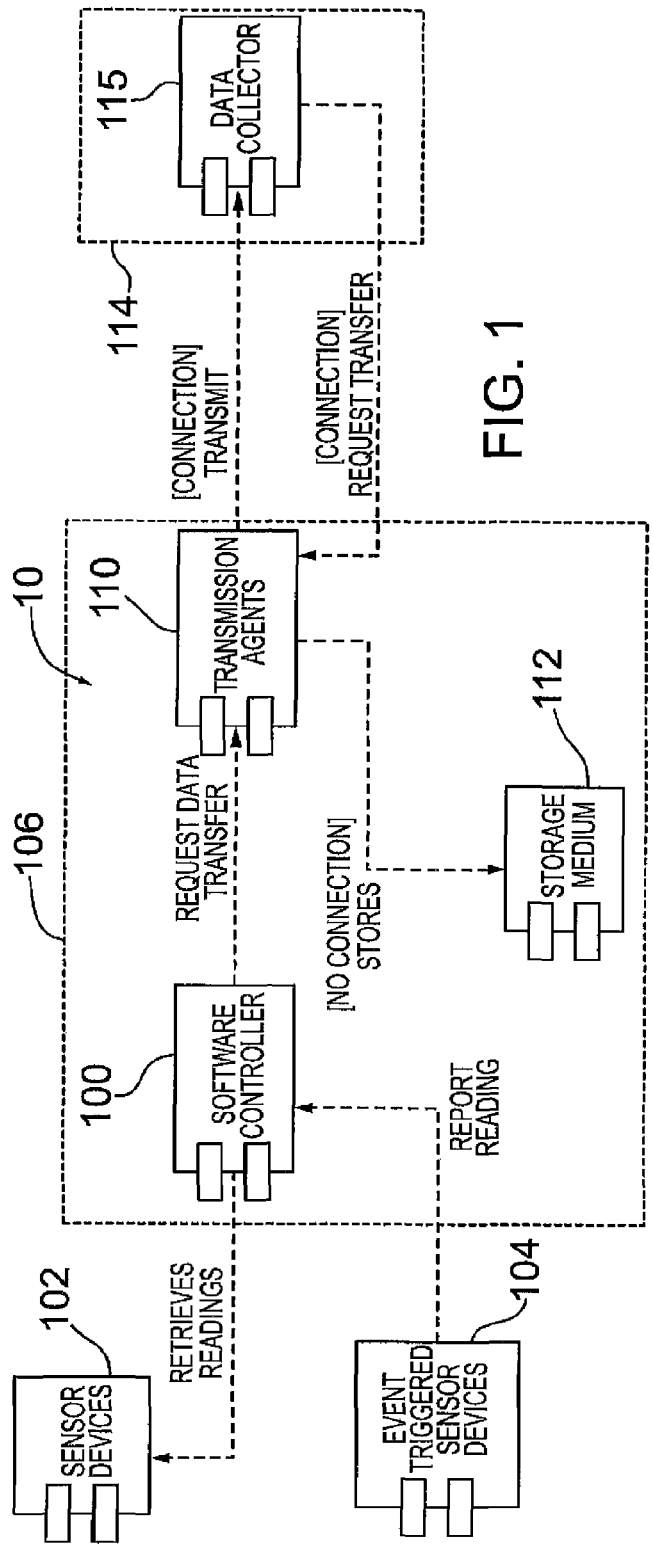

NTP WITH PERMANENT
CONNECTION

METHOD AND APPARATUS FOR UNDERGROUND EQUIPMENT MONITORING

FIELD

This invention relates to the data monitoring of equipment within underground environments.

BACKGROUND

Vehicles operating within underground environments produce large volumes of data from a diversity of sensors and systems including engine and transmission parameters, emissions, weights, pre operations checklist, production statistics, ground speed, location, tire conditions, and alarms. Retrieving this data set and transferring it to the surface or to any other facility monitoring the underground environment is a key factor for monitoring and improving the utilization of the vehicles both from a safety perspective and an efficiency perspective.

Underground environments, such as mines, transportation and service tunnels to mention a few, usually have limited wireless network connectivity, with wireless access points sparsely distributed around the underground environment. A vehicle may enter a hotspot (area with Wi-Fi coverage on an underground location) during its work cycle. Sometimes the vehicles are only exposed to seconds of network connectivity per day. A store-and-forward system which is configured to transmit prioritized data is required to effectively monitor the vehicle(s)/underground environment conditions.

There is a great diversity of technologies available for underground communication, including but not limited to, Wi-Fi, Leaky Feeder, through-the-earth (TTE), digital radio, mesh networks and others. Each technology has its different bandwidth capacities and different availabilities in the underground environment. For example, an underground environment could have a Wi-Fi network offering high-bandwidth data transfer but vehicles are typically only in range giving transmission coverage for several seconds during their cycle, also a Leaky Feeder network could be available offering extended coverage time but at lower bandwidth. It is common that underground infrastructure includes a mixture of these technologies.

SUMMARY

According to the present invention there is provided a computer-implemented method of transferring data captured on underground vehicles using multiple communication channels and a prioritization mechanism. The sensors' readings, independently of the source, are represented in a standardized way (data point) and transferred to surface according to a calculated priority based on factors that could be dynamically adjusted.

The invention takes into consideration the status of each communication channel and it is capable of storing the data for further transmission if a particular communication channel is not available. The invention also provides a mechanism to maintain the clock synchronization to secure time stamp accuracy within the second.

By using the concept of a transmission agent, communications protocols and channels are provided with a unified API (Application programming interface) that allows the seamless integration of new protocols and channels into the system.

Thus, an embodiment disclosed herein includes a system for monitoring an underground environment, comprising:

a) a plurality sensors distributed throughout the underground environment;

b) a first computer controller programmed with instructions to store a plurality of sensor readings from said plurality of sensors with each sensor reading being represented as a data point so that the plurality of data points are stored, said first computer controller being programmed with instructions to prioritize said plurality of data points according to selected priority criteria;

c) a second computer controller, said first computer controller being programmed with instructions to transmit, over at least one communication channel, said plurality of prioritized data points to said second computer controller, said first computer controller being programmed with instructions to store said plurality of prioritized data points in a temporary storage medium in the event no communication with said second computer is available, said first computer being programmed with instructions to continually attempt to transmit said plurality of prioritized data points to said second computer over said at least one communication channel; and d) said second computer controller being programmed with instructions to translate said plurality of prioritized data points, once received by said second computer, into information that is interpretable by a monitoring system which monitors the underground environment.

Another embodiment disclosed herein includes a method for monitoring an underground environment, comprising:

a) collecting sensor readings from one or more sensors distributed throughout the underground environment and storing said sensor readings in a first computer controller with each sensor reading being represented as a data point so that a plurality of data points are stored, prioritizing said plurality of data points for transmission to a second computer controller;

c) transmitting said prioritized data points to a second computer controller over at least one communication channel and, in the event said at least one communication channel is not open or available, storing said prioritized data points in a temporary storage medium and continually attempting to transmit said prioritized data points to said second computer over at least one communication channel; and d) translating said prioritized data points, once received by the second computer, into information that is interpretable by a monitoring system which monitors the underground environment.

A further understanding of the functional and advantageous aspects of the disclosure can be realized by referencing the following detailed description and drawings.

BRIEF DESCRIPTION OF THE DRAWINGS

Embodiments will now be described, by way of example only, with reference to the drawings, in which:

FIG. 1 provides a general overview of a system constructed in accordance with the present invention.

FIG. 2 shows details about the data point structure.

DETAILED DESCRIPTION

Figure 3:
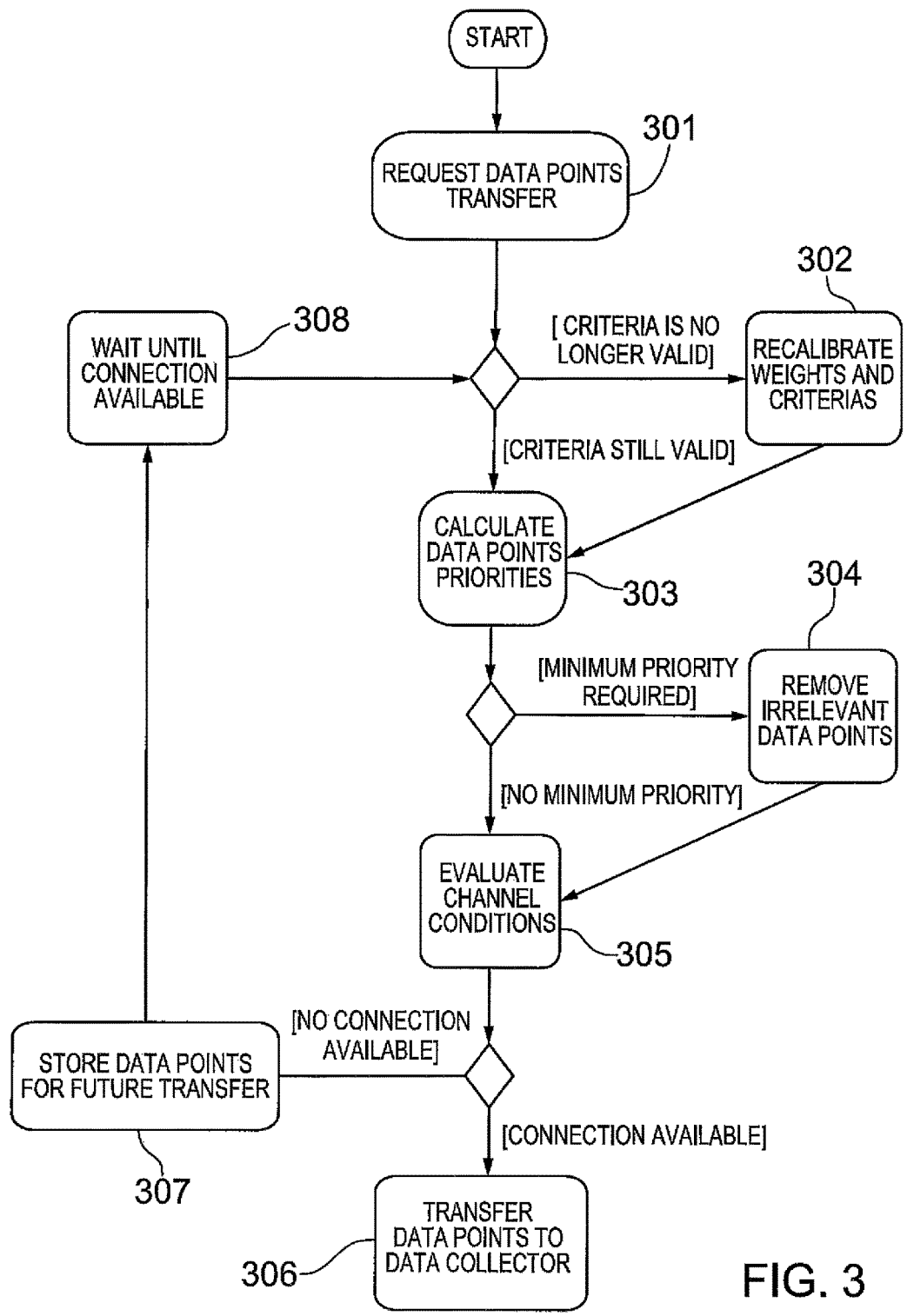
FIG. 3 illustrates how the data is transmitted to surface.

Various embodiments and aspects of the disclosure will be described with reference to details discussed below. The following description and drawings are illustrative of the disclosure and are not to be construed as limiting the disclosure. The drawings are not to scale. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in this specification including claims, the terms, "comprises" and "comprising" and variations thereof mean the specified features, steps, or components are included. These terms are not to be interpreted to exclude the presence of other features, steps, or components.

As used herein, the term "exemplary" means "serving as an example, instance, or illustration," and should not be construed as preferred or advantageous over other configurations disclosed herein.

As used herein, the terms "about" and "approximately", when used in conjunction with ranges of dimensions of particles, compositions of mixtures, or other physical properties or characteristics, are meant to cover slight variations that may exist in the upper and lower limits of the ranges of dimensions so as to not exclude embodiments where on average most of the dimensions are satisfied but where statistically dimensions may exist outside this region. It is not the intention to exclude embodiments such as these from the present disclosure.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein the expression "polling rate" means the number of seconds between sensor readings that are executed. For example a sensor with a polling rate of 30 seconds will produce two readings in one minute, while a sensor with a polling rate of 1 second will produce 60 readings in one minute.

As used herein the expression "event triggered sensor device" means a sensor that reports a reading immediately when certain of one or more conditions (events) have occurred. Such sensors are actively reporting the data each time the predefined condition (event) occurs, in contrast to those sensors that only report their data passively (when the sensor is consulted). Event triggered sensor devices are usually used, but not limited to alarms, human generated data or data produced asynchronously.

As used herein the expression "multi-threading environment" refers to computer systems were the software is allowed to have multiple execution pathways running simultaneously. Several parts of the program are being executed in parallel in the context of a single process, sharing resources but executing independently.

As used here in the expression "storage medium" refers to a computer Input/output device used to store data which is capable retaining such data without requiring a continuous power supply. Such a device may be, but is not limited to, a hard drive, a flash storage, optical disks, floppy disks or magnetic tapes.

Unless defined otherwise, all technical and scientific terms used herein are intended to have the same meaning as commonly understood to one of ordinary skill in the art. Unless otherwise indicated, such as through context, as used herein, the following terms are intended to have the following meanings.

FIG. 1 shows a general overview of the present system shown generally at 10. A computer controller 106, which includes a software controller 100, transmission agent 110 and storage medium 112 and programmed in accordance with the present invention, gathers all data from one or more sensor devices 102 and one or more event-triggered sensor devices 104. Data may be polled from sensors 102 using a dynamically configurable polling rate. Also the computer controller 106 may receive readings from sensor device(s) 104 triggered by a particular event.

The sensors 102 and 104 may include, but is not limited to, any one or combination of air temperature, battery voltage, chlorophyll, carbon monoxide, carbon dioxide, compass, vehicle engines, load weight systems, tire pressure and temperature sensors, mono-nitrogen oxides, oxygen, production statistics, vehicle preoperational checklist, location, wind speed and direction, ground speed, RPM, emergency brake release, vehicle radio remote control, proximity detection, Speed Guard connection, accelerometers, temperature, water quality and distance meter sensors, seismic sensors and other types of sensors. Some of sensors 102 and 104 may be mounted on one or more vehicles in the underground environment to monitor vehicle conditions, and others may be mounted to the infrastructure of the underground environment to monitor environmental conditions, and may be placed in strategic locations depending on what the sensors are configured to detect or sample.

The sensor(s) 102 may be one or more sensor devices, such as but not limited to engine temperature, pressure, vehicle speed, torque, atmospheric pressure, engine load, coolant temperature, coolant pressure, carbon monoxide level, nitrogen oxides emitted, fuel consumption rate, battery voltage, brake pedal status.

The sensor(s) 104 may be one or more event triggered sensor devices, such as but not limited to preoperational checklist, production statistics, oil level alarms, coolant level alarms, tire pressure alerts and location sensors.

The data collected from the sensor(s) 102 and 104 by the first computer controller 106 are represented as data points (FIG. 2). The data points collected are transferred to the surface (or to some other location remote from the first computer controller 106) using different transmission agents 110 based on a priority calculation.

Computer controller 106 is programmed with instructions to prioritize the plurality of data points according to selected priority criteria for transmission to the second computer controller 114. In the event a communication channel is not open or available, the prioritized data points are stored in storage medium 112 and then transmitted once one or more communication channels are open.

As used herein, the phrase "transmission agent(s)" means the software module responsible for transferring the prioritize data points collected from the sensor(s) 102 and 104 to the second computer controller 114 which functions as a data collector. In an embodiment, there is a transmission agent per communication protocol/channel available. If a communication channel is not available, data is not transferred but stored locally in storage medium 112 until communication can be established at which point it is communicated to the surface or underground control monitoring center.

Once the communication channel is available the prioritized data points are transmitted to second computer controller 114 which is typically, but not necessarily, located on the surface.

The second computer controller 114 has a data collector 115 which is the software module responsible for receiving all data points. Data collector 115 is programmed in a multi-threading environment, assigning one separate execution thread for each individual computer controller 106 being monitored by the system 10.

The system is configured so that all sensor readings are permanently stored, or archived, in storage medium 112. Thus, in addition to current prioritized data points being transmitted, the computer controller 114 is programmed to request the multiple transmission agents 110 transmit historical data stored in the computer controller 106. For example, it is possible that low priority data over time is not transmitted to computer controller 114 due to its low priority but computer controller 114 is programmed to be able to request that data should it be required.

As used herein, the phrase "purge period" refers to the number of days that the computer controller 106 will maintain the data collected. The computer controller 106 will automatically delete all those data points that were collected a number of dates more than purge period. The computer controller 106 could use as purge period a pre-programmed value or dynamically calculate based on the polling rate and the available space on the storage medium. The second computer controller 114 may be programmed with instructions to send instructions to the first computer controller 106 to change the purge period.

Second computer controller 114 is programmed with instructions to translate the received prioritized data points, once received by computer controller 114, into information that is interpretable by a monitoring system which monitors the underground environment. This information may be visually displayed on one or more displays for observation by one or more human operators, or it may be configured to be interpretable by a monitoring system which is under control of a fully autonomous control system without human operator interaction, or it may be presented in a combination of a first format suitable to be visually displayed for observation by one or more human operators and a second format presentable to a fully autonomous control system.

Data Point Structure

A data point is a structure representing a sensor reading. FIG. 2 shows the main components of a data point and in accordance with the present disclosure each data point comprises a) sensor id 201, b) value 202 of the parameter being sensed, (c) data type 203, (d) time-stamp 204 and (e) location 205 and (f) priority 206

Sensor id 201 uniquely identifies the sensor device 102 or the event-triggered sensor device 104 that produced the signal of interest. There may be multiple sensor devices 102 and/or multiple event-triggered sensor devices 104 attached to the first computer controller 106.

Value 202 represents a reading from a sensor device 102 or an event-triggered sensor device 104 and may be for example a temperature reading, pressure reading, air quality reading to mention just a few, and these readings may be digital or analogue (for example a digital reading may be performed by converted to analogue using a Digital/Analog converter).

The type of the reading 203 in FIG. 2 depends on the sensor but could be of different kinds: an integer (positive or negative), a floating point number (single-precision 32-bit according to IEEE 754 definition), a logical value (true or false) or a binary object (XML file, video, image, voice recording, etc.), depending on the application.

The time-stamp 204 represents the reading time, the exact time when the reading was taken from the sensor device 102 or the event-triggered sensor device 104, expressed as the difference in milliseconds between the reading time and midnight, Jan. 1, 1970 UTC.

The location 205 represents the place where the sensor was located the moment the reading was taken by the sensor.

Priority setting 206 represents the base priority of the data point represented as a non-negative number being zero the highest priority possible and order inverse to the natural numbers. For example a data point with a priority representation of 1 will have a higher priority on the system than a data point with a priority number 2

Data Prioritization

The transmission agent 110 is programmed with instructions to prioritize the plurality of data points according any one or combination of sensor type, status of the at least one communication channel, a current time that the sensor readings are being recorded, a location of the plurality of sensors in the underground environment, a value of the sensor readings falling outside an established range of expected sensor readings, and/or a mandated acceptable length of time between sensor readings from each sensor.

Thus transmission agent 110 selects which data to transmit (ignoring non-relevant/redundant data) and in which order, based on established priorities calculated for each individual data point. A priority is implemented as a positive number, with zero being the maximum priority. There is no limit on the lower priority, but for practical effects any priority greater than 100 is consider a real low priority.

Individual priorities are calculated using the basic formula:

$$\sum_{i=0}^{i=n} \omega_i * p_i(\text{datapoint})$$

where $\omega_i$ represents a relative weight of the ith criteria. A weight is a number between 0 and 1, and the sum of the weights of all the criteria must be 1 and $p_i$ is a function that calculates the priority that should be assigned to data point based on the ith criteria.

Each transmission agent 110 maintains its own set of criteria/weights that may be adjusted by a technician or dynamically generated by machine learning techniques. Examples of criteria are (a) source sensor, (b) state of the communication channel, (c) current time, (d) location of the unit, (e) age of the data and (f) expected reading range.

Transmitting Process

FIG. 3 shows a flow diagram of the transmitting process of data from the underground sensor device(s) 102 and/or event-triggered sensor device(s) 104. The system 10 includes at least one communication channel and preferably two or more communication channels. In a preferred embodiment there are two or more communication channels. The first computer controller 106 is programmed with instructions to transmit the plurality of prioritized data points simultaneously over these two or more communication channels and with more than one communication channel there is a chance the same data points will be transmitted over the different communication channels which would produce redundant data in the second computer controller 114. The second computer controller 114 is programmed with instructions to filter the received data points and discard redundant data points when two or more identical data points are received by the second computer controller 114.

This filtering process is based on the fact that each of the prioritized data points includes a sensor identifier which identifies a particular sensor, and further includes a time-stamp representing a time that the sensor reading was taken. The second computer controller 114 is programmed with instructions to filter the received data points by comparing the sensor identifier and time stamp of each of received data point and discarding those that are identical with previously received data points.

FIG. 3 shows the transmitting process that is initiated by a request to transfer data points in step 301. A request can come from the software controller 100 in case of new readings from sensor devices 102 and/or event-triggered sensor devices 104, or from data collector 115 in case of historical data.

The transmission agent 110 is programmed to determine if its priorities criteria and weights are still valid. The transmission agent 110 maintains a flag to indicate if criteria/weight calibration is required, and if they are not, it calibrates them in step 302. Recalibration is needed when, but not limited to, when: a) new criteria has been added, b) a trigger event activates a dormant criteria (i.e., an alarm condition, or the time of the day changed), c) the communication channel has changed its bandwidth, d) a machine learning algorithm executed by the computer controller 106 has suggested new weights, e) a remote criteria adjustment has been received from surface and f) a technician adjusts the criteria weights. Based on the valid criteria/weight the transmission agent calculates individual priorities for each data points to be transmitted shown as step 303 in FIG. 3.

It is possible for a transmission agent 110 to require a minimum priority to transmit data points, in this case irrelevant data points are discarded by the transmission agent 110 in step 304. For example, a transmission agent 110 with a minimum priority transmission of 10 will discard any data point that has a priority greater than 10. Any data point with a priority number of zero is considered a top priority.

Second computer controller 114 is programmed with instructions to send instructions to the first computer controller 106 to change the selected priority criteria. For example to assist equipment maintenance personnel, troubleshooting from the surface might require more data or a certain type of sensors, this can be achieved by instructing the second computer controller 114 to send instructions to the first computer controller 106 to increase the priority of data collected by such sensors.

The system may be configured so that a human operator can instruct the second computer controller 114 to transmit changes in the selected priority criteria to computer controller 106, or the monitoring system may be configured to independently instruct the second computer controller 114 to send this information, or a combination of both types may be utilized.

Computer controller 106 is programmed with instructions so that transmission agents 110 are continuously evaluating communication channel conditions in step 305. If there is connectivity, it will transfer the prioritized data points to surface in step 306. If there is no connection, data points are stored locally in storage medium 112 for future transfer in step 307. The transmission agent(s) 110 keep monitoring the channel until a connection is available shown in step 308, in which case it will retry the process. This wait period is not blocking, a new transfer request could be accepted and will be placed in a queue in storage medium 112 until the communication is restored or possible.

The transmission agent 110 maintains a separate execution thread dedicated to monitor the status of the channel and to perform the transmission of all data points collected.

Multiple Transmission Agents

Figure 4:
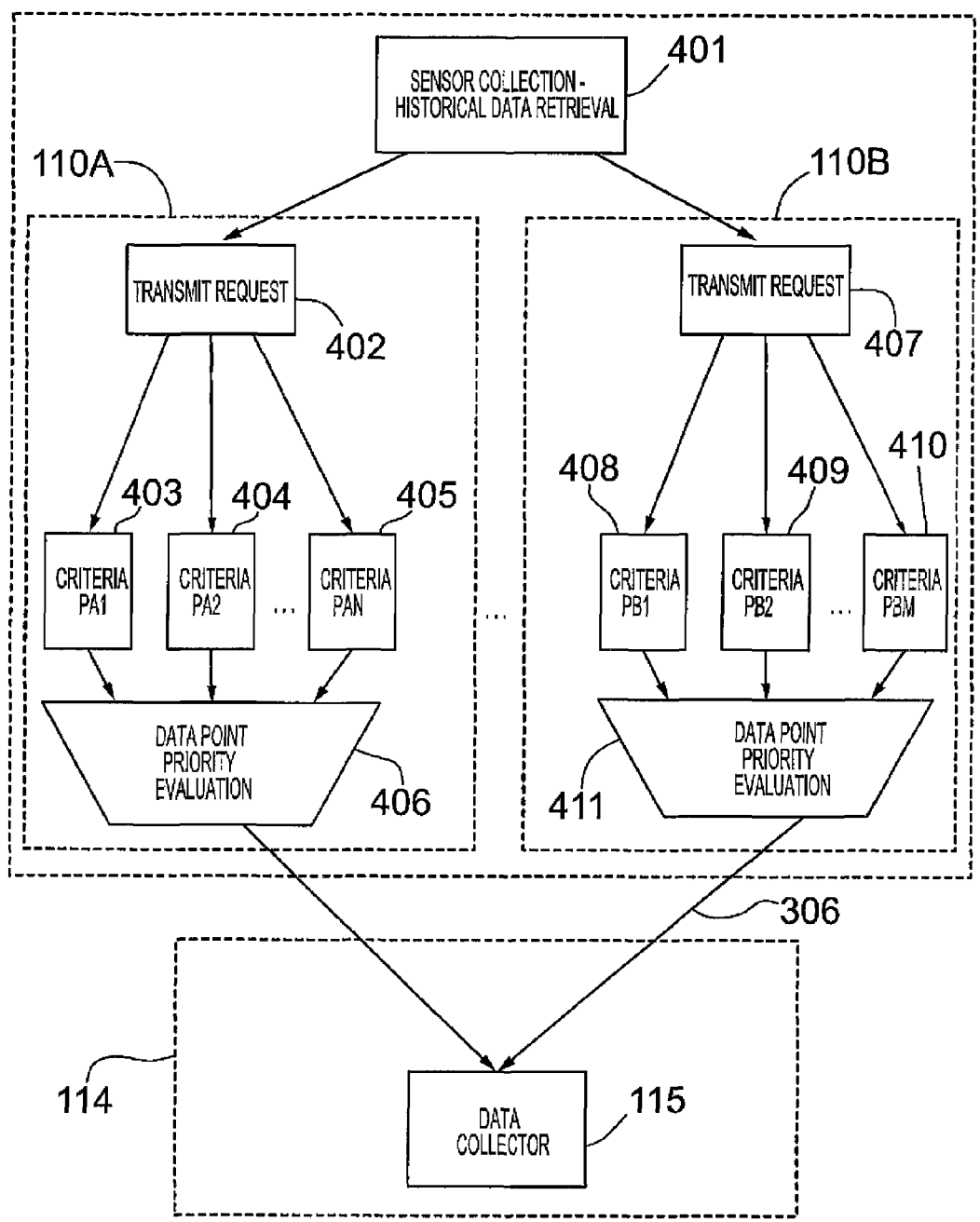
FIG. 4 is a detailed diagram of multiple transmitting agents and their internal structure.

System 10 allows the use of an arbitrary number of transmission agents 110, each controlling a communication protocol/channel as illustrated on FIG. 4. A communication protocol is a set of defined rules on how to exchange data. Some protocols that could be used to transfer data are OPC-UA (Object Linking and Embedding for Process Control-Unified Architecture), object serialization, FTP (file transfer protocol), SCP (secure copy protocol), HTTP (Hypertext Transfer Protocol), RPC (Remote Procedure Call), RSYNC (Remote synchronization), TCP (transmission Control Protocol), UDP (User Datagram Protocol), SOAP (Simple Object Access Protocol), SNMP (Simple Network Management Protocol) and SMTP (Simple Mail Transfer Protocol). A communication channel is a medium used to transfer the data, such Wi-Fi, RS232, RS485, digital radio, Ethernet and others.

In step 401 data points are collected from sensor device(s) 102 and/or event-triggered sensor device(s) 104 or retrieved from the storage medium 112, in case of archived requests. Such data points are passed to each transmission agent as a transmission request in steps 402 and 407 as shown in FIG. 4.

Each transmission agent 110 has a set of criteria (403, 404, 405, 408, 409 and 410) used to evaluate the priority of each data point received for transmission.

A criteria could be, but is not limited to: a) source sensor (data points from sensor alarms could be consider more relevant), b) time of the day (production statistics comes more relevant before the end of the shift), c) location of the vehicle (load weight near the dumping point tend to be more relevant), d) available bandwidth, e) time from the last transmission (to avoid that data from low-priority sensors that is never transmitted, after a preselected period of time since the last transmission, the agent could give more priority to such data).

FIG. 4 shows two transmission agents 110A and 110B, (but it will be noted there may be many more and the present system and method is not restricted to two). Each transmission agent 110 has its own set of criteria independent from other transmission agents on the unit. For example, transmission agent 110A may be specifically configured to communicate over Leaky Feeder and transmission 110B may be specifically configured to communicate over Wi-Fi. Transmission agent 110A could have three criteria (n=3): a) give priority to alerts; b) consider pre-check information relevant and c) production stats when the unit was near a dumping location. Transmission agent 110B could have four criteria (m=4): a) give priority to engine sensor, b) give priority to tire sensors, c) give priority to emissions when there is extra bandwidth available and d) increase priority of pre-check and production stats after 4:00 pm.

Transmission agents 110A evaluate the data points in step 406 and transmission agent 110B evaluates data points in step 411. All of the transmission agents 110 are programmed with a set of criteria and weights used to evaluate the priority of each data point. For each data point, a transmission agent 110 will calculate its priority using the formula described on the Data Prioritization section and will transfer these prioritized data points to the data collector 115 in step 306 (see FIG. 3 as well). Depending on criteria and priority settings, a data point may be transferred more than one time over multiple transmission channels and the data collector 115 is responsible for dealing with duplicate data. The data collector 115 uses the timestamp to discard those data points that has been previously received (duplicates)

Data Duplication

Data collector 115 is responsible for discarding duplicate data points that arrives through one or multiple transmission agents 110. Data collector 115 uses the time-stamp of a data point to determine if it is dealing with a duplicate, in which case the new value is discarded. Correct time data generation is a key factor to distinguish data. A tolerance of 500 ms is preferred.

Figure 6:
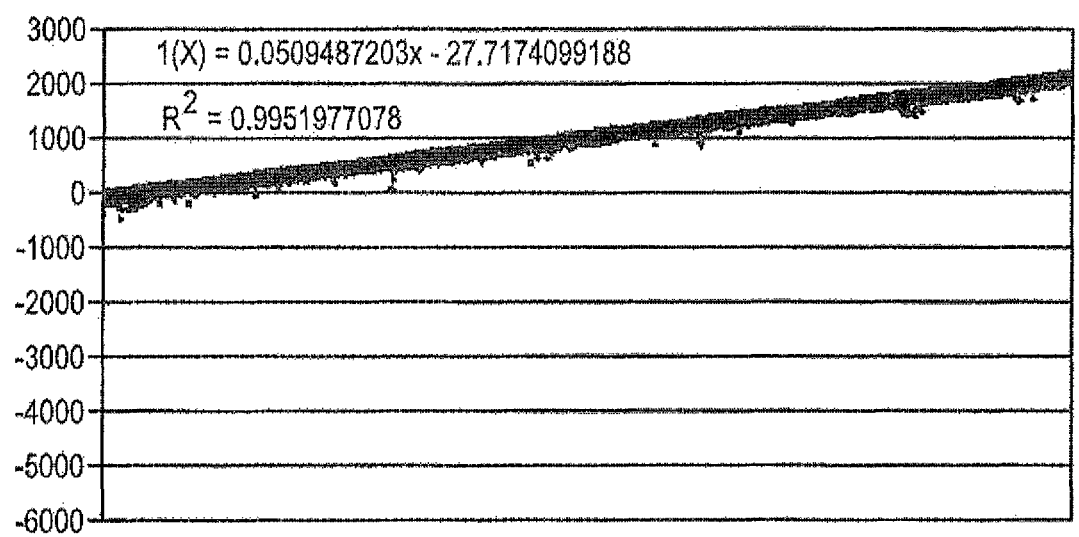
FIG. 6 shows the natural drift of a clock.
Figure 7:
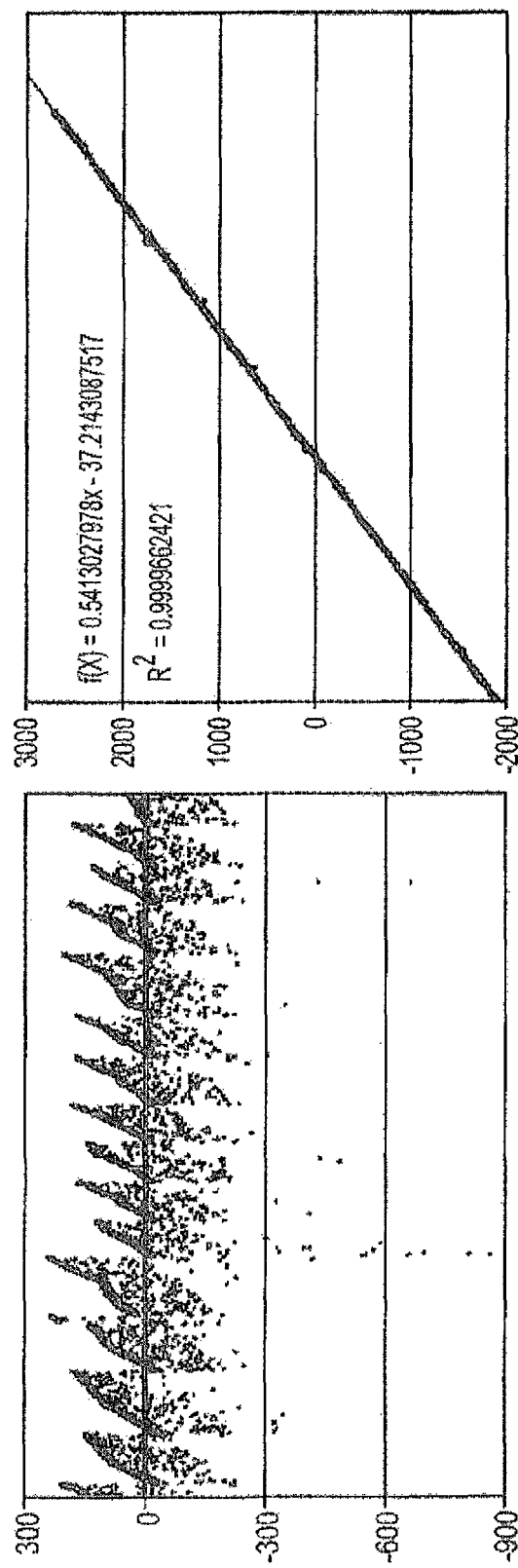
FIG. 7 compares the drift of the NTP (Network Time Protocol) between different connectivity conditions.

Relying on the hardware clock without using external synchronization is not recommended, since the clock has a natural drift (estimated on 0.0509 millisecond per second) that will exceed the 500 ms tolerance in less than three hours as can be seen in FIG. 6. Current synchronization solutions such as NTP (Network Time Protocol) can provide synchronization within the tolerance in environments with permanent network, but it is inadequate for environments with limited network connectivity as illustrated on FIG. 7. In environments with limited network connectivity a proposed approach is to monitor the network connectivity and trigger synchronization with an external server when a new connection is detected.

Thus first computer controller 106 is programmed with instructions, when at least one communication channel is open and available; to synchronize its internal clock with a reference clock that is connected communication channel. In an embodiment, the reference clock is located on the second computer controller 114; however it will be understood the reference clock may not be part of the second computer controller 114.

Figure 5:
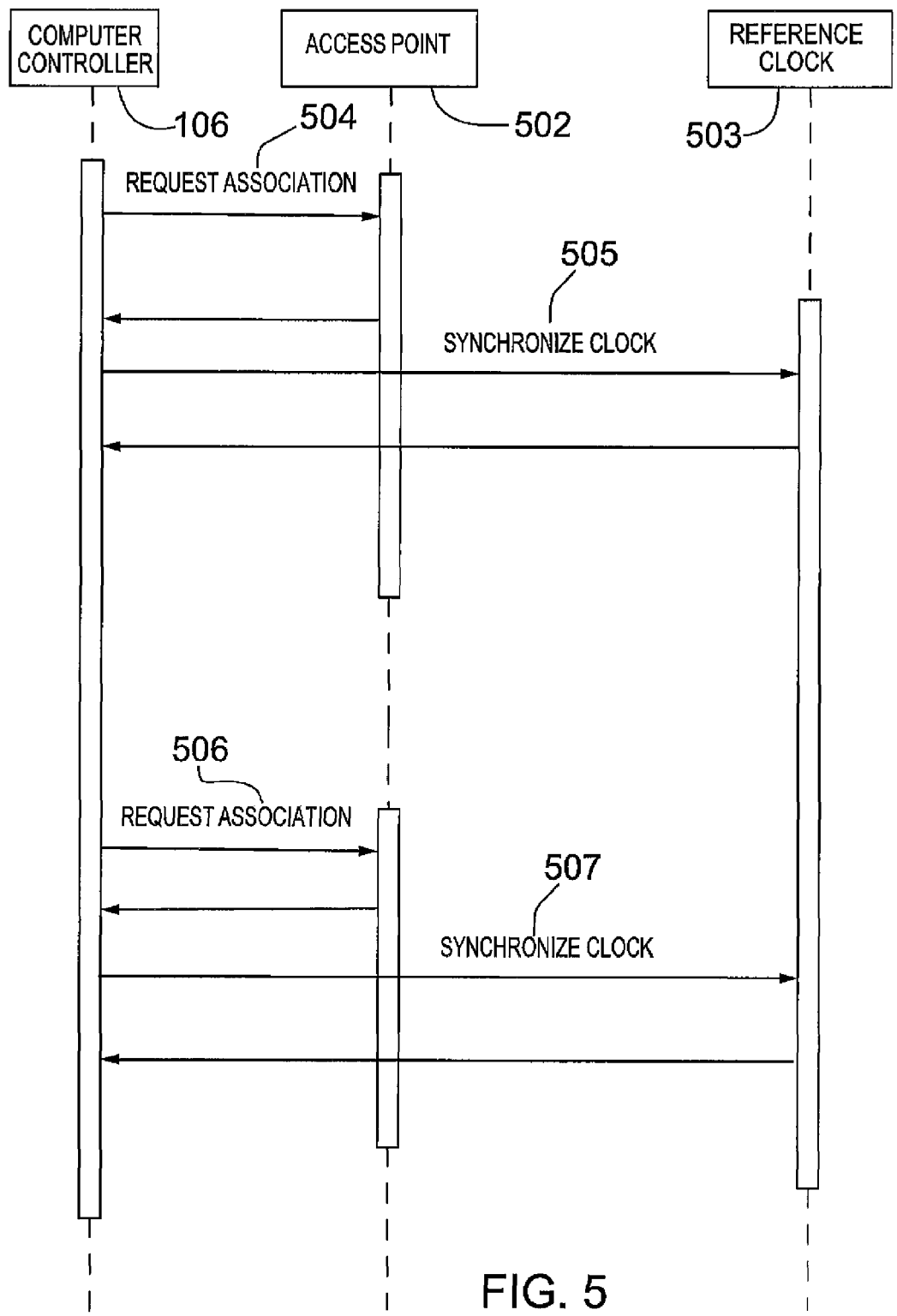
FIG. 5 presents a method of clock synchronization triggered by network activity.
Figure 8:
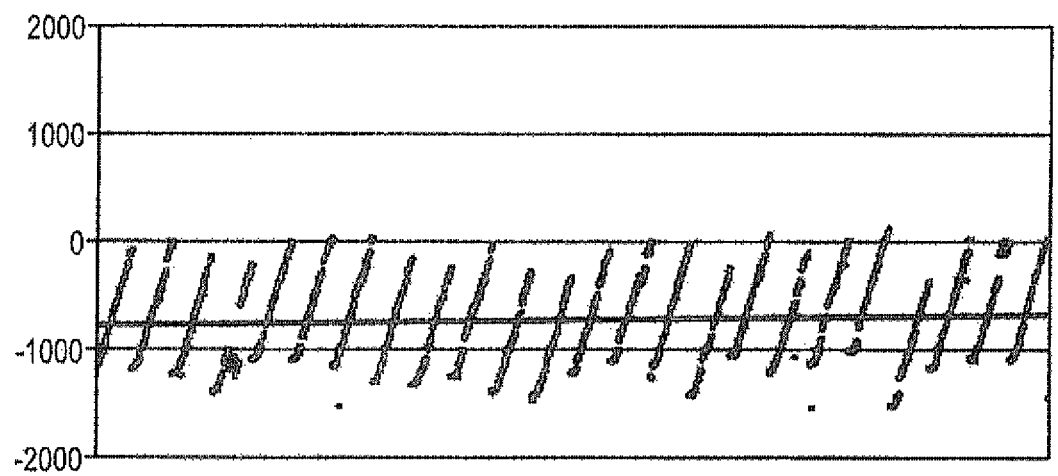
FIG. 8 shows the drift using network-triggered clock synchronization.

Referring to FIG. 5, the first computer controller 106 is constantly trying to connect to an access point 502 which is a device that provides wireless network connectivity to first computer controller 106 by sending a request for association in step 504, and once the request is granted, a clock synchronization event is triggered to the reference clock 503 in step 505. Future synchronization event(s) in step 507 are requested each time an access point 502 processes an association request in step 506. The network triggered synchronization is capable to maintain the clock synchronized within a tolerance of 500 milliseconds as shown on FIG. 8.

General Software Architecture

Figure 9:
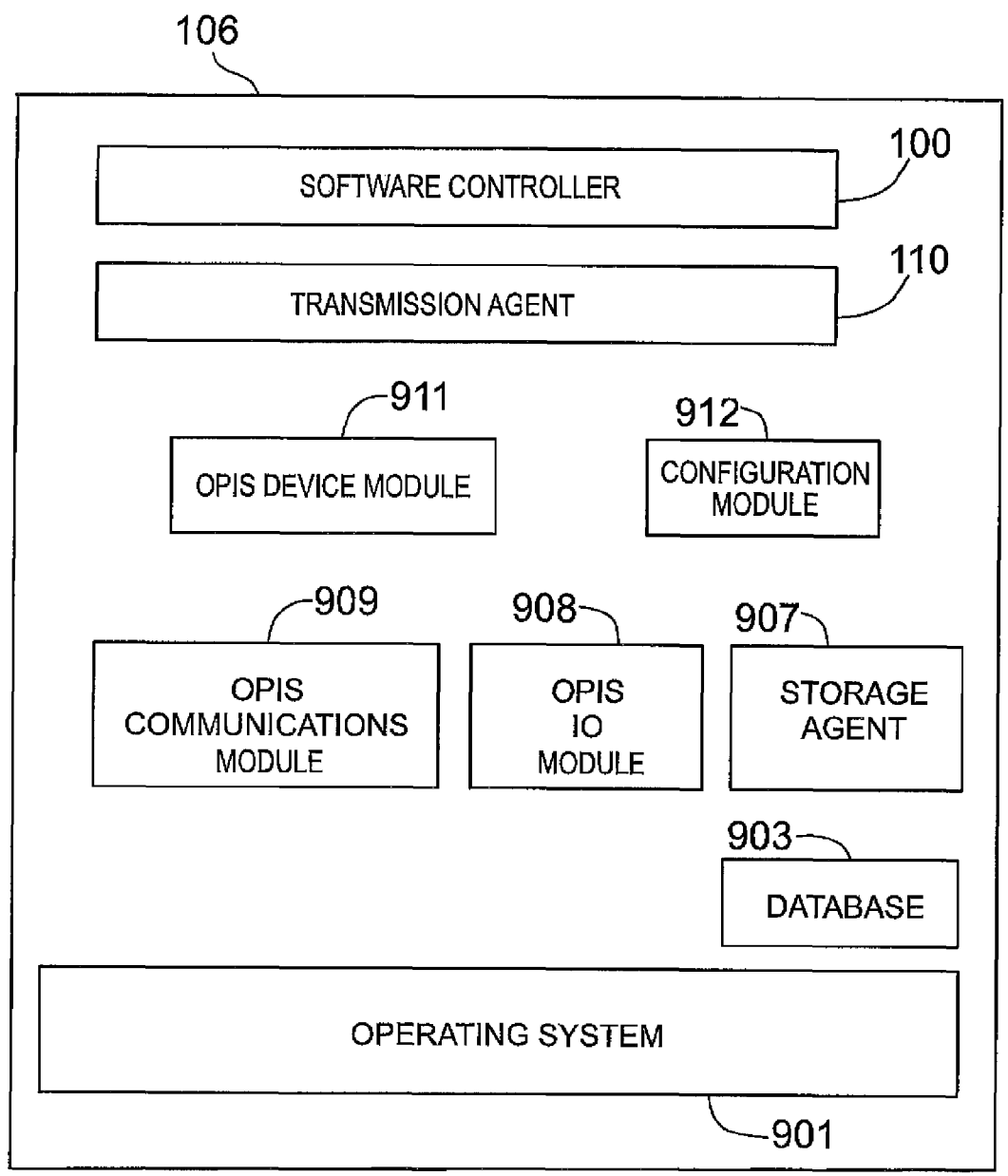
FIG. 9 outlines the general software architecture of the present invention.

FIG. 9 shows the general architecture of the solution from a software perspective. An operating system 901 is used to interface directly with the hardware.

A database 903 is used in the system to store readings from sensor device(s) 102 and/or event-triggered sensor device(s) 104. A storage agent 907 is a software module that encapsulates the details of the storage medium 112 used to store the data points. The storage agent 907 provides a standard interface for any component in the first computer controller 106 (transmission agents 110, OPIS device module 911, configuration module 912 and/or the software controller 100) and the database 903.

OPIS (Open Platform for Intelligent Systems) is a framework developed and disclosed herein by the inventors that facilitates the integration of a diversity of sensors (engine, pressure, temperature, accelerometers, compass, water and air quality and others) and networks. The main components of the OPIS include OPIS communication module 909, OPIS IO module 908 and OPIS device module 911.

OPIS Communications module 909 is a software module that allows data communication using high-level communication protocols, such as but not limited to OPC-UA (Object Linking and Embedding for Process Control—Unified Architecture), Modbus, JMS (Java Message Service), FTP (File Transport Protocol), Satellite communication, serial (Leaky Feeder), radio frequency, web services (SOAP, REST), Secure Copy, Secure File Transfer Protocol and others.

OPIS IO module 908 is a software module providing input/output capabilities on low-level communication protocols, such as but not limited to CAN (Controller Area Network), digital/analogous ports, SAE J1939 (Society of Automotive Engineers J1939), RS232 (Recommended Standard 232), RS485 (Recommended Standard 485) and others.

OPIS device module 911 is a software module that retrieves readings from sensor device(s) 102 and/or event-triggered sensor device(s) 104 using OPIS Communications module 909, OPIS IO module 908 or a combination of both.

Transmission agents 110 are configured to allow the transfer of the data collected from the sensors to the second computer controller 114, typically on the surface rather than in the underground environment.

Finally, the configuration module 912 controls and maintains all configuration parameters of the first computer controller 106, including but not limited to (a) configuration parameters of a transmission agents 110, (b) configuration parameters of a sensor device 102 and/or event-triggered sensor device 104, (c) purge period, (d) polling rate and (e) software updates.

Hardware Architecture

Figure 10:
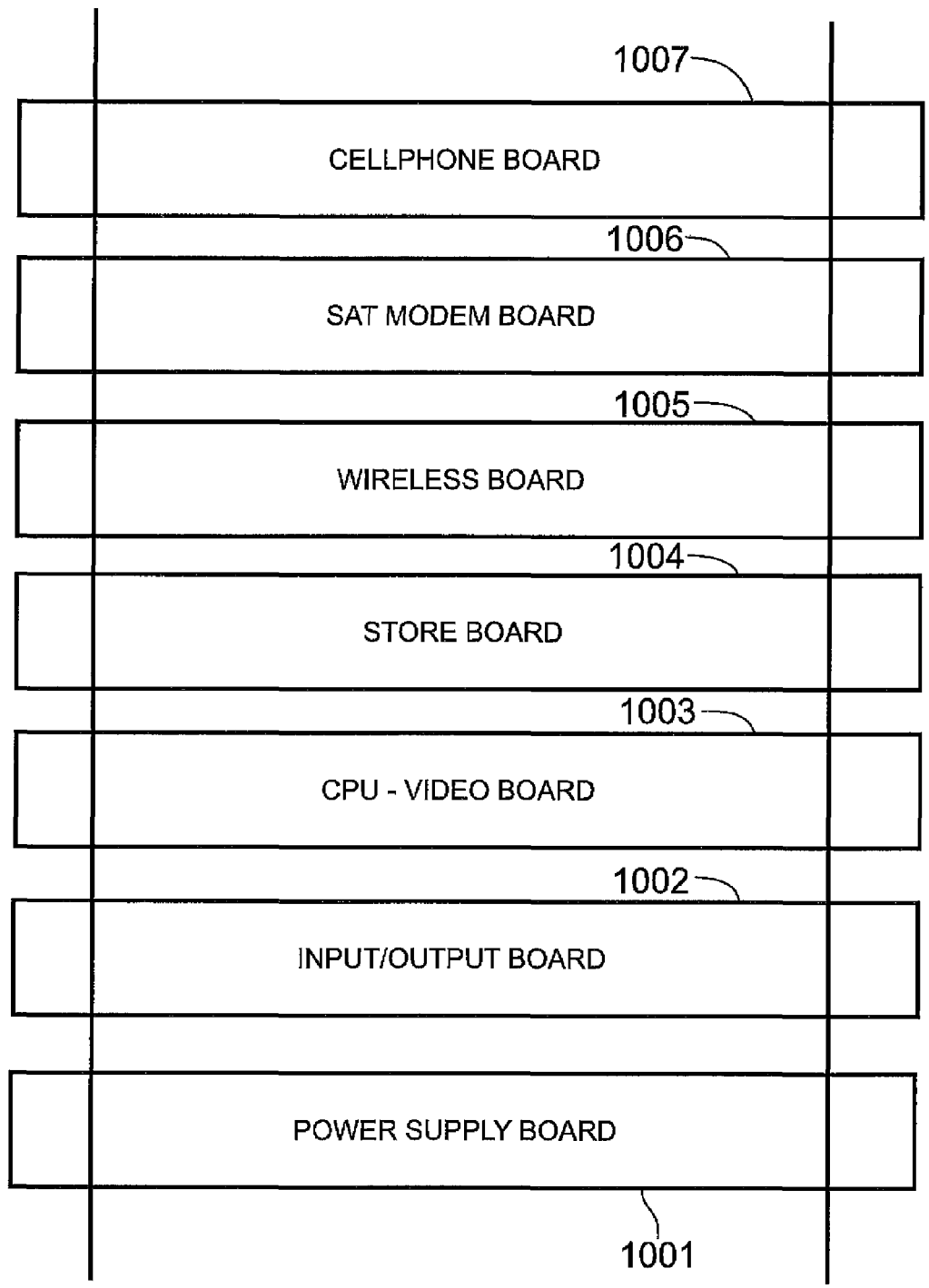
FIG. 10 shows the hardware architecture of the system of the present invention.

FIG. 10 shows the general hardware components of first computer controller 106, an industrial-grade computer system built on a PC-104 stack. The computer is assembled using ruggedized hardware components, specifically designated to resist the extreme conditions found within underground environments, such as but not limited to extreme temperatures, shock vibrations, atmospheric pressure, oil, fungus, water and dust exposure as described on SAE J1455 standard (Society of Automotive Engineers Recommended Environmental Practices for Electronic Equipment Applications). The enclosure used for the first computer controller 106 should provide a minimum IP65 level according to the specifications of the International Protection Rating.

Depending on the conditions of the underground environment, superior ratings like IP67 might be used.

The power supply board 1001 provides power to all the components inside the unit. It is also capable of monitoring the ignition switch of the vehicle and alert the operating system 901 that a shutdown will be required. This allows the transmission agents to properly save the data for future transfer.

The input/output board 1002 provides the basic communication features to connect serial RS232, RS485, CAN (Controller Area Network) and digital sensors to the unit.

The CPU—video board 1003 is the main processing unit, and provides LAN, VGA (Video Graphics Array) display output and USB (Universal Serial Bus).

The storage board 1004 provides permanent storage medium 112, including but not limiting to, memory flash card and SSD (Solid State Drivers). The storage board 1004 might provide more than one storage medium 112.

The first computer controller 106 includes one or more communication boards that could include, but are not limited to, wireless Wi-Fi board 1005, satellite modem board 1006 and cellphone board 1007.

It is possible to integrate with other communication boards by using external communication devices such as Leaky Feeder radio modem that are connected using any of the input/output options offered by the I/O Board 1002 like RS232, CAN or RS485.

The second computer controller 114 could be implemented using a traditional server system and does not requires mayor ruggedized components when it is located on an office or control room environment on the surface. When the second computer controller 114 is located on an infrastructure on the underground environment it might require to be configured with ruggedized components with a quality similar to those used by the first computer controller 106.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Sensor Reading Process

Figure 11:
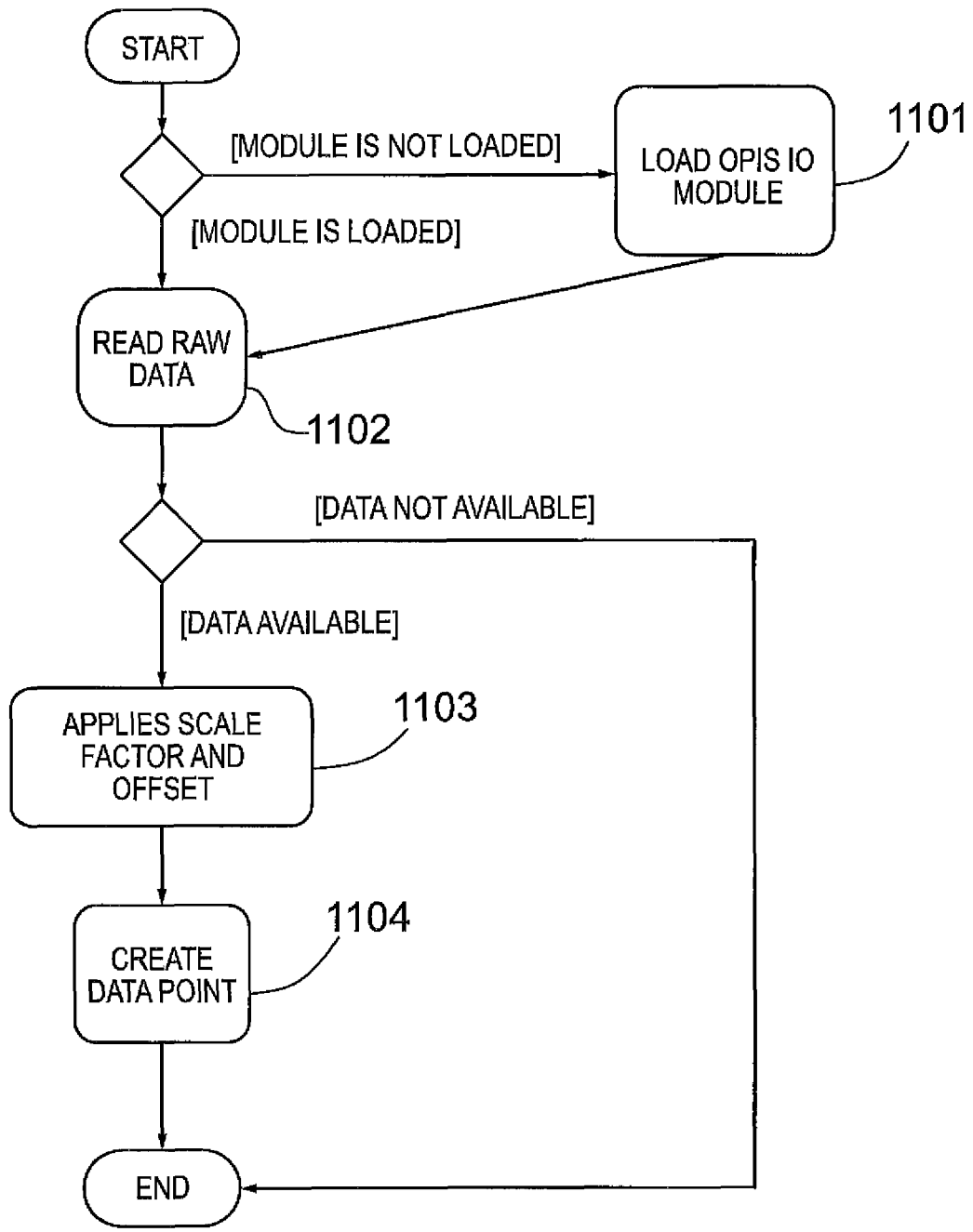
FIG. 11 is a flowchart illustrating the steps involved in the present process to retrieve data from the sensors.

FIG. 11 shows the process for retrieving data from sensor device(s) 102 by the OPIS device module 911. OPIS device module 911 depends on an OPIS IO module 908 to read the data from the sensor. The OPIS IO module 908 encapsulates the low-level protocols used to communicate with the sensor hardware, such as but not limited to CAN (Controller Area Network), digital/analogous ports, SAE J1939 (Society of Automotive Engineers J1939), RS232 (Recommended Standard 232) and RS485 (Recommended Standard 485). Depending on the capabilities offered by the sensor a higher-level protocol might be used to retrieve the data, on such cases the OPIS device module 911 may use an OPIS Communication module 909 to communicate with the sensor.

The software controller 100 is periodically retrieving data points from the OPIS device module 911 according to a defined polling rate. The software controller 100 is programmed to assign the location 205 to the data points (refer FIG. 2 for details on the data point structure), archive them on the storage medium 112 and follow the transmitting process described in FIG. 3.

FIG. 11 shows the process followed by the OPIS device module 911 to take readings from sensor device(s) 102. The OPIS device module 911 verifies that the required OPIS IO module 908 is already loaded in memory. If such module is not present in memory the OPIS device module 911 will proceed to load it in step 1101.

The OPIS device module 911 will try to read raw data from the sensor device 102 in step 1102. If no data is available the process comes to an end. If raw data is available, the final data reading is generated by multiplying it by a scale factor and adding an offset in step 1103. For example, for a sensor requiring a scale factor of 2 and offset of 20, a raw value of 4 will produce a final value 28 (4*2+20=28).

The OPIS device module 911 uses the final calculated value to create a data point in step 1104 following the structure described on FIG. 2.

Event-Triggered Sensor Reading Report Process

Figure 12:
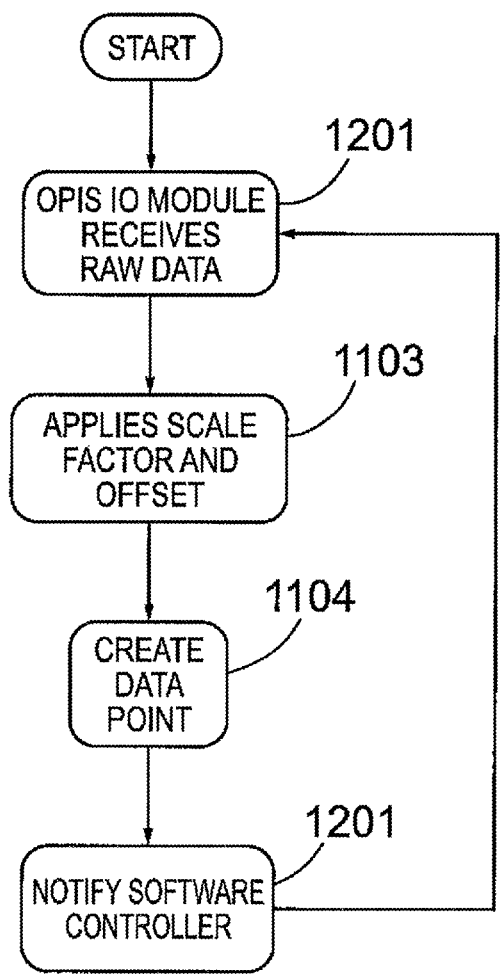
FIG. 12 is a flow chart showing the process to report data from an even-triggered sensor.

FIG. 12 shows the process followed to report the readings from event-triggered sensor device(s) 104. An OPIS device module 911 controlling an event-triggered sensor device 104 runs on a separate thread (execution unit) from the software controller 100.

An event-triggered sensor device 104 produces a reading only when a particular condition occurs (the event). The nature of the event is diverse, it includes but it is not limited to: a) alarms b) human operator interaction, c) signal reception and d) connection establishment and e) location detection.

Event-triggered sensor device(s) 104 are used to monitor asynchronous external activities, while sensor device(s) 102 are used to monitor synchronous activities. The software controller 100 acts as passive listener that it is notified of the event by the OPIS device module 911.

The OPIS device module 911 uses the OPIS IO module 908 to receive raw data from the event-triggered sensor device 104 in step 1201 on a blocking reading operation. As used here in the expression "blocking reading operation" means that if data is not available (the event has not yet occurred) the reader's thread will suspend its execution and remain dormant (blocked) until the event occurs (and raw data become available).

Depending on the capabilities offered by the event-triggered sensor device 104, the OPIS device module 911 may use an OPIS communication module 909 instead of the OPIS IO module 908. This is the case for sensors that offer higher-level communication protocols, such as but not limited to OPC-UA (Object Linking and Embedding for Process Control—Unified Architecture), Modbus, JMS (Java Message Service), FTP (File Transport Protocol), Satellite communication, serial (Leaky Feeder), radio frequency and web services (SOAP, REST).

When the event occurs and the raw data is received the OPIS device module 911 will calculate the final data reading by multiplying the raw value by a scale factor and adding an offset in step 1103.

The OPIS device module 911 will use the final calculated reading value to create one or more data points in step 1104 following the structure described on FIG. 2. Then the OPIS device module 911 notifies the software controller in step 1204 about the new data points and returns to step 1201.

After being notified in step 1204, the software controller 100 assigns the location 205 to the data points (refer FIG. 2 for details on the data point structure), archives them in the storage medium 112 and follows the transmitting process described in FIG. 4.

Data Collection Process

Figure 13:
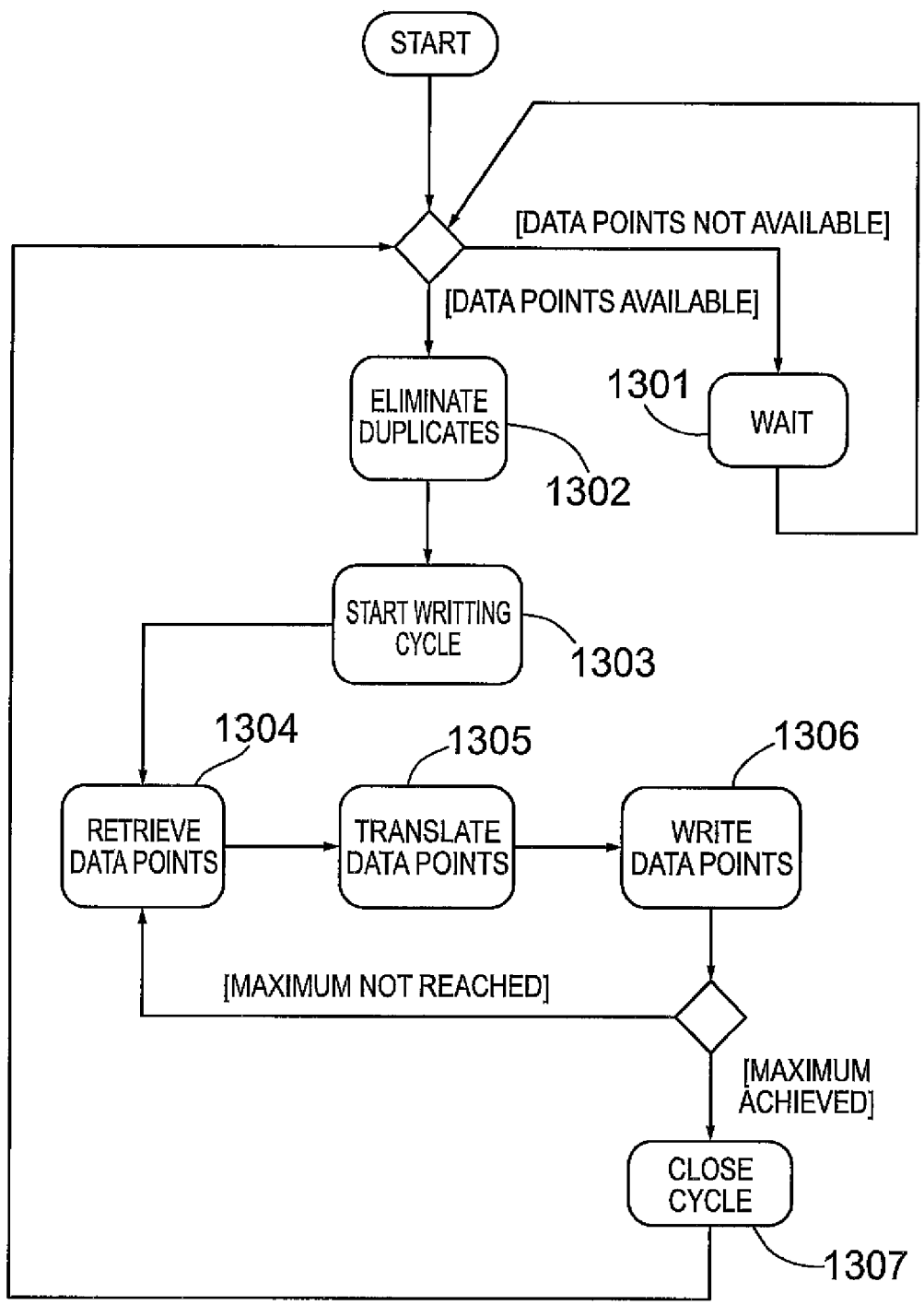
FIG. 13 is a flowchart showing the data collection process.

FIG. 13 outlines the process followed by the second computer controller 114 in order to collect data points from one or more first computer controller 106. The second computer controller 114 requires a multi-thread environment and will assign a separate execution thread for each transmission agent 110 and for each first computer controller 106.

The data collector 115 will try to retrieve data points from transmission agents 110 located inside the first computer controller 106. If the channel is not available or there are no more data points to retrieve, the data collector 115 is instructed to wait in step 1301 for an amount of milliseconds, called timeout period. After the timeout period has been passed the execution is resumed and the data collector 115 will verify again the conditions of the channel and the availability of data points.

After reading the data points, the data collector 115 inspect the timestamp of the data points and discards all those data points that have been previously collected (duplicates) in step 1302.

The data collector 115 could be instructed to store the collected data points into data warehouse storage, such as but not limited to CVS files (Comma separated values), XML (Extensible Markup Language), a SQL compatible data base (Structured Query Language), a round robin database, big data storage, or any combination of them.

The data collector 115 starts a writing cycle in step 1303 by performing all the operations required to prepare the data warehouse storage(s) to write the collected data points. The operations required depend on the type of the data warehouse storage(s) used and the Information Technology infrastructure available. For example, when using a SQL compatible data base, the operation required could include establishing a connection, preparing a transaction, creating required tables and others.

The data collector 115 then retrieves a subset of the available data points in step 1304. The amount of data points retrieved will depend on resource constraints, such as, but not limited to memory, space available and type of data warehouse storage. At this point the data collector 115 performs any translation required to the data point subset as shown in step 1305. Such translations include but are not limited to a) data tags translations (a data tag is a name used to uniquely identify a type of data source into certain information systems), b) unit conversion, c) data consolidation (such as accumulators and counters), d) statistics collection (such as average, minimum, maximum), e) time zone conversions and f) location positioning (translating location identifiers into a representation suitable for a Geographical Information System).

Thereafter the data collector 115 performs all the operations required to store such translated data points into the data warehouse storage in step 1306.

The data collector 115 maintains a counter with the number of cycles executed once that counter reaches a maximum level or there are no more data points to retrieve by the data collector 115 then the cycle is closed in step 1307 by performing all operations required after finalizing writing points, such as, but not limited to, closing data base connections, finalizing files, moving files to directories, committing transactions and others.

The data collector 115 performs its operations as an infinite loop; after closing the cycle in step 1307, it will start the operation again by verifying the availability of more data points available and will continue processing them or waiting (step 1301) in the event that all data points have been already retrieved.

Configuration Management Process

Figure 14:
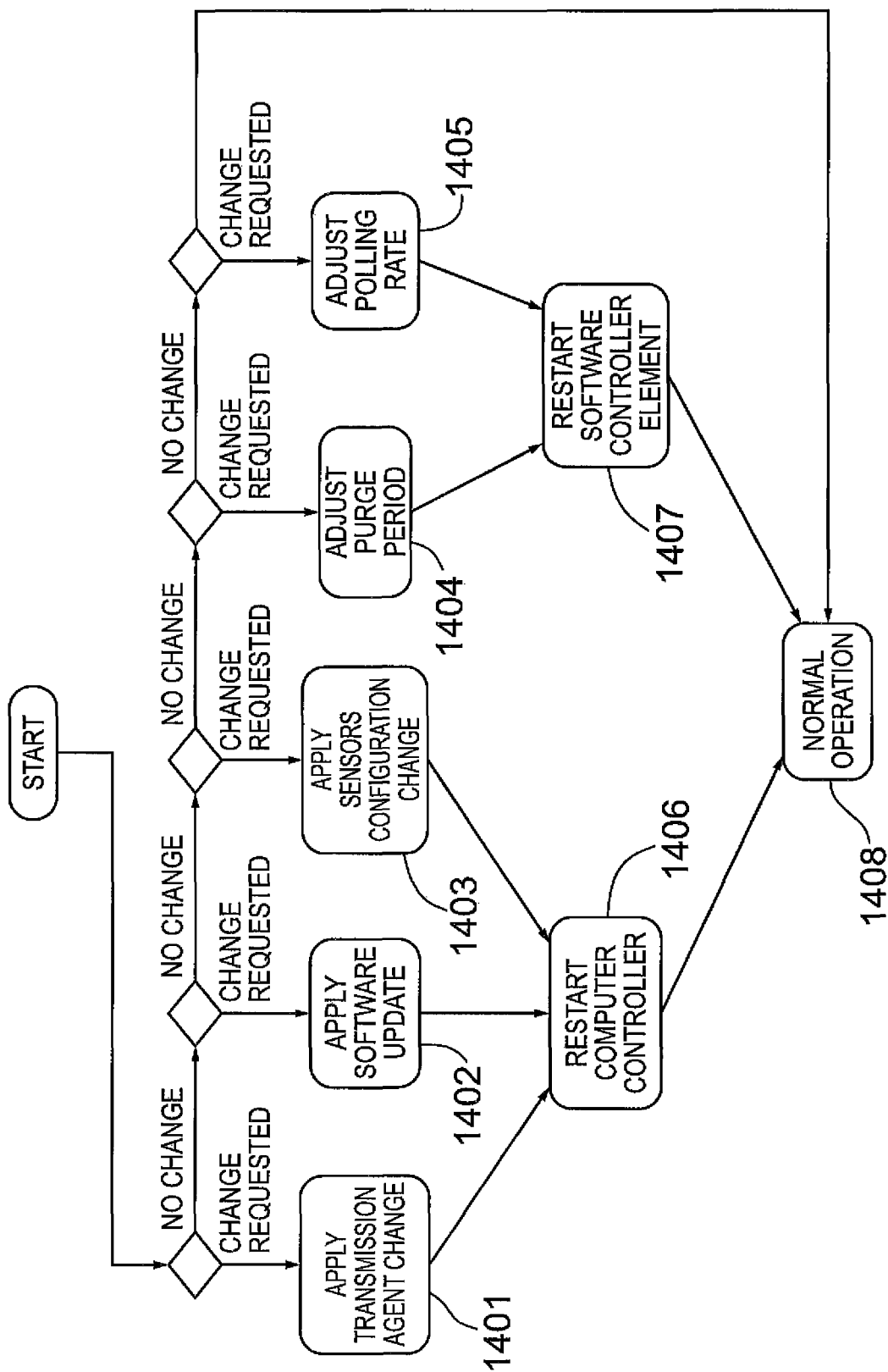
FIG. 14 is a flowchart illustrating the configuration of the management process.

FIG. 14 illustrates the process to apply configuration changes to the first computer controller 106. A configuration change may be sent to the configuration module 912 by a human interacting with the operator administration tool on the first computer controller 106 or requested by the second computer controller 114, which can be requested by a human or by software instructions.

Depending on the type of configuration change requested it might be required to fully restart the first computer controller 106 or just reinitialize the software controller 100.

The configuration module 912 reviews if there is a request to change configuration of the transmission agent 110, such as but not limited to: a) channel configuration, b) node identification parameters, c) criteria and weights used to prioritize data points transmission. If there is a configuration change requested it applies the change in step 1401 and requests a restart of the first computer controller 106 in step 1406.

A configuration module 912 could receive a request to update the software on the first computer controller 106. If such request is made, the configuration module 912 installs the new software update in step 1402 and then requests a restart of the computer controller in step 1406.

Sensor configuration changes could be requested to the configuration module 912. Such changes are related but not limited to: a) scaling factor, b) offset, c) type of sensor, d) OPIS IO module and e) OPIS communication module. The Configuration module 912 performs the requested changes to the OPIS device module 911 in step 1403 and then requests a restart of the computer controller in step 1406.

After the first computer controller 106 has been restarted in step 1406, the first computer controller 106 continues its normal operation in step 1408.

If the configuration module 912 receives a request to adjust the purge period, it adjusts the purge period parameter in step 1404 and then requests a restart of the software controller in step 1407. The adjustment period could be increased or decreased depending on polling rate and space available in the storage medium 112.

When the configuration module 912 receives a request to increase or decrease the polling rate of a particular sensor, it processes to properly adjust the polling rate in step 1405 and then to request a restart of the software controller in step 1407.

After the requested restart of the software controller in step 1407, the first computer controller 106 continues its normal operation in step 1408.

Therefore what is claimed is:

1. A system for monitoring a vehicle and the vehicle's surroundings within an underground environment, comprising:
   a) a plurality sensors distributed on the vehicle and throughout the underground environment;
   b) a first computer controller programmed with instructions to store a plurality of sensor readings from said plurality of sensors with each sensor reading being represented as a data point so that the plurality of data points are stored, said first computer controller being programmed with instructions to prioritize said plurality of data points according to selected priority criteria, wherein each of said prioritized data points includes at least a sensor identifier which identifies a particular sensor and further includes at least a timestamp representing a time that the sensor reading was taken;
   c) a second computer controller, said first computer controller being programmed with instructions to transmit, over one or more communication channels, said plurality of prioritized data points to said second computer controller, said first computer controller being programmed with instructions to store said plurality of prioritized data points in a temporary storage medium in the event no communication with said second computer is available, said first computer being programmed with instructions to continually attempt to transmit said plurality of prioritized data points to said second computer over said one or more communication channels, said second computer controller is programmed with instructions to filter said plurality of received data points and discard redundant data points when two or more identical data points are received by said second computer controller over one or more communication channels, said second computer controller being programmed with instructions to send instructions to the first computer controller to change the selected priority criteria by instructing the second computer controller to send instructions to the first computer controller to increase the priority of data collected be selected sensors; and d) said second computer controller also being programmed with instructions to translate said plurality of prioritized data points, once received by said second computer, into information that is interpretable by a monitoring system which monitors the underground vehicle and its environment.

2. The system according to claim 1, wherein said one or more communication channel is two or more communication channels and said first computer controller is programmed with instructions to transmit said plurality of prioritized data points simultaneously over said two or more communication channels.

3. The system according to claim 2, wherein said second computer controller is programmed with instructions to filter said plurality of received data points by comparing said sensor identifier and time stamp of each of said plurality of received data points and discarding those that are identical with previously received data points.

4. The system according to claim 1, wherein said first computer controller is programmed with instructions to prioritize said plurality of data points according any one or combination of sensor type, status of said one or more communication channel, a current time that said sensor readings are being recorded, a location of said plurality of sensors in said underground environment, a value of said sensor readings falling outside an established range of expected sensor readings, a mandated acceptable length of time between sensor readings from each sensor.

5. The system according to claim 1, wherein said second computer controller is programmed to send instructions to said first computer controller to change said selected priority criteria.

6. The system according to claim 1, wherein said first computer controller is programmed with instructions to synchronize its internal clock with a reference clock that is connected to said one or more communication channel when said one or more communication channel is open and available.

7. The system according to claim 6, wherein said reference clock is located on said second computer controller.

8. The system according to claim 1, wherein some of said plurality of sensors distributed in said underground environment are mounted on one or more vehicles located in said underground environment, wherein some of said plurality of sensors distributed in said underground environment are mounted on infrastructure of said underground environment.

9. The system according to claim 8, wherein at least some of said sensors mounted on said one or more vehicles are configured to monitor selected vehicle conditions.

10. The system according to claim 1, wherein said information that is interpretable by said monitoring system is visually displayed on one or more displays for observation by one or more human operators.

11. The system according to claim 1, wherein said information that is interpretable by said monitoring system is presented to a fully autonomous control system.

12. The system according to claim 1, wherein said information that is interpretable by said monitoring system is presented in a combination of a first format suitable to be visually displayed for observation by one or more human operators and a second format presentable to a fully autonomous control system.

13. The system according to claim 5, wherein a human operator can instruct said second computer to change said selected priority criteria.

14. The system according to claim 5, wherein said monitoring system is programmed with instructions to instruct said second computer to change said selected priority criteria.

15. The system according to claim 5, wherein said second computer controller is programmed with instructions to allow one or both of said monitoring system and a human operator to change said selected priority criteria.

16. The system according to claim 1, wherein said first computer is programmed with instructions to archive all said data points, and wherein second computer controller is programmed with instructions to request from said first computer controller, any of said archived data points when said one or more communication channel is open and available.

17. The system according to claim 2 wherein each of said two or more communication channels has an associated transmission module programmed with instructions to communicate with said second computer controller using a selected communication method and associated protocols.

18. The system according to claim 2 wherein said first computer controller is programmed with instructions to apply prioritizing criteria to the prioritized data points transmitted by each of said two or more communication channels.

19. The system according to claim 1, wherein said first computer controller is programmed with instructions to archive all said data points and to automatically delete all data points that have been archived in the first computer controller for more than a preselected period of time.

20. A method for monitoring a vehicle and the vehicle's surroundings within an underground environment, comprising:

a) collecting sensor readings from one or more sensors distributed on the vehicle and throughout the underground environment and storing said sensor readings in a first computer controller with each sensor reading being represented as a data point so that a plurality of data points are stored, prioritizing said plurality of data points for transmission to a second computer controller, wherein each of said prioritized data points includes at least a sensor identifier which identifies a particular sensor, and further includes at least a timestamp representing a time that the sensor reading was taken;

c) filtering said plurality of prioritized data points in the second computer controller and discarding redundant data points when two or more identical data points are received by the second computer controller;

d) transmitting said prioritized data points to a second computer controller over one or more communication channels and, in the event said one or more communication channel is not open or available, storing said prioritized data points in a temporary storage medium and continually attempting to transmit said prioritized data points to said second computer over one or more communication channels, said second computer controller being programmed with instructions to send instructions to the first computer controller to change the selected priority criteria by instructing the second computer controller to send instructions to the first computer controller to increase the priority of data collected be selected sensors; and e) translating said prioritized data points, once received by the second computer, into information that is interpretable by a monitoring system which monitors the underground vehicle and its environment.

21. The method according to claim 20, wherein said one or more communication channel is two or more communication channels and including transmitting said plurality of prioritized data points simultaneously over said two or more communication channels.

22. The method according to claim 21, wherein filtering said plurality of received data points is achieved by comparing said sensor identifier and time stamp of each of said plurality of received data points and discarding those that are identical with previously received data points.

23. The method according to claim 20, including prioritizing said plurality of data points according any one or combination of sensor type, status of said one or more communication channel, a current time that said sensor readings are being recorded, a location of said plurality of sensors in said underground environment, a value of said sensor readings falling outside an established range of expected sensor readings, a mandated acceptable length of time between sensor readings from each sensor.

24. The method according to claim 20, including the second computer controller sending instructions to said first computer controller to change said selected priority criteria.

25. The method according to claim 20, including said first computer controller synchronizing its internal clock with a reference clock that is connected to said one or more communication channel when said one or more communication channel is open and available.

26. The method according to claim 25, wherein said reference clock is located on said second computer controller.

27. The method according to claim 20, wherein some of said plurality of sensors distributed in said underground environment are mounted on one or more vehicles located in said underground environment, wherein some of said plurality of sensors distributed in said underground environment are mounted on infrastructure of said underground environment.

28. The method according to claim 27, wherein at least some of said sensors mounted on said one or more vehicles are configured for monitoring selected vehicle conditions.

29. The method according to claim 20, including visually displaying the information that is interpretable by said monitoring system on one or more displays for observation by one or more human operators.

30. The method according to claim 20, including presenting said information that is interpretable by said monitoring system to a fully autonomous control system.

31. The method according to claim 20, wherein said information that is interpretable by said monitoring system is presented in a combination of a first format suitable to be visually displayed for observation by one or more human operators and a second format presentable to a fully autonomous control system.

32. The method according to claim 24, wherein instructing said second computer controller sending instructions to said first computer controller to change said selected priority criteria is controlled by a human operator.

33. The method according to claim 24, wherein instructing said second computer controller sending instructions to said first computer controller to change said selected priority criteria is controlled by the monitoring system.

34. The method according to claim 24, wherein instructing said second computer controller sending instructions to said first computer controller to change said selected priority criteria is controlled by either one or combination of the monitoring system and a human operator.

35. The method according to claim 20, including archiving all data points, and including accessing and retrieving any of said archived data points when said one or more communication channel is open and available when said archived data points are required.

36. The method according to claim 21 wherein each of said two or more communication channels communicates using a selected communication method and associated protocol different from each of the other communication channels.

37. The method according to claim 21 including applying prioritizing criteria to the prioritized data points transmitted by each of said two or more communication channels.

38. The method according to claim 20, wherein said first computer controller is programmed with instructions to archive all said data points and to automatically delete all data points that have been archived in the first computer controller for more than a preselected period of time.

* * * * *